(12) United States Patent
Corbet et al.

(10) Patent No.: US 11,484,826 B2
(45) Date of Patent: Nov. 1, 2022

(54) PROCESS FOR PURIFYING CRUDE SYNTHESIS GAS TO PRODUCE AN ACID GAS AND ACID GAS SEPARATOR

(71) Applicant: L'Air Liquide, Societe Anonyme pour l'Etude et l'Exploitation des Procedes Georges Claude, Paris (FR)

(72) Inventors: Sharon Corbet, Frankfurt am Main (DE); Alfred Gubrinski, Erzhausen (DE); Pankaj Puri, Faridabad (IN); Dorit Rappold, Frankfurt am Main (DE); Sophia Schmidt, Frankfurt am Main (DE)

(73) Assignee: L'Air Liquide, Société Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 503 days.

(21) Appl. No.: 16/585,197

(22) Filed: Sep. 27, 2019

(65) Prior Publication Data

US 2020/0101415 A1    Apr. 2, 2020

(30) Foreign Application Priority Data

Sep. 28, 2018  (EP) ..................................... 18020472

(51) Int. Cl.
*B01D 53/14* (2006.01)
*C01B 3/02* (2006.01)
(Continued)

(52) U.S. Cl.
CPC ............ *B01D 53/1468* (2013.01); *C01B 3/02* (2013.01); *C01B 3/506* (2013.01);
(Continued)

(58) Field of Classification Search
None
See application file for complete search history.

(56) References Cited

FOREIGN PATENT DOCUMENTS

| CN | 106 281 476 | 1/2017 |
|----|-------------|--------|
| DE | 26 44 323   | 4/1978 |

(Continued)

OTHER PUBLICATIONS

EP Search Report for EP 18020472, dated Feb. 28, 2019 (Machine Translation).

*Primary Examiner* — Daniel Berns
(74) *Attorney, Agent, or Firm* — Justin K. Murray

(57) ABSTRACT

The invention relates to a gas scrubbing process for purifying crude synthesis gas with methanol as a physical absorption medium, wherein an acid gas comprising at least hydrogen sulfide ($H_2S$) is produced. The acid gas is produced in a hot regenerator arranged downstream of an absorption apparatus and subsequently separated from gaseous methanol in an acid gas separator by cooling and condensation. The acid gas separator has a condensation region and an absorption region, wherein both regions are separated from one another by a gas-permeable tray. This has the result that impurities such as hydrogen cyanide and/or ammonia outgassing from a first acid gas substream are not reabsorbed in the condensation region of the acid gas separator, thus avoiding an accumulation of impurities in the hot regenerator or other parts of the gas scrubbing plant. The invention further relates to an acid gas separator and to the use of the acid gas separator according to the invention in a process according to the invention.

12 Claims, 2 Drawing Sheets

(51) Int. Cl.
  *C01B 3/50* (2006.01)
  *C01B 17/04* (2006.01)
  *C10K 1/00* (2006.01)
  *C10K 1/16* (2006.01)

(52) U.S. Cl.
  CPC ...... *C01B 17/0408* (2013.01); *B01D 2252/10* (2013.01); *B01D 2252/2021* (2013.01); *B01D 2252/50* (2013.01); *C01B 2203/0415* (2013.01); *C01B 2203/0485* (2013.01)

(56) References Cited

FOREIGN PATENT DOCUMENTS

| | | |
|---|---|---|
| DE | 10 2007 052137 | 5/2009 |
| DE | 10 2012 006748 | 10/2013 |
| WO | WO 2016/120018 | 8/2016 |

PROCESS FOR PURIFYING CRUDE SYNTHESIS GAS TO PRODUCE AN ACID GAS AND ACID GAS SEPARATOR

CROSS REFERENCE TO RELATED APPLICATION

This application claims the benefit of priority under 35 U.S.C. § 119 (a) and (b) to European patent application No, EP18020472.9, filed Sep. 28. 2018. the entire contents of which are incorporated herein by reference.

FIELD OF THE INVENTION

The invention relates to a process for purifying crude synthesis gas with methanol as a physical absorption medium, wherein an acid gas comprising at least hydrogen sulfide ($H_2S$) is produced. The invention further relates to an acid gas separator for separating an acid gas comprising at least hydrogen sulfide ($H_2S$) from a gas mixture and to the use of the acid gas separator according to the invention in the process according to the invention.

PRIOR ART

Processes for removal of undesired concomitants from industrial crude synthesis gases by physical or chemical absorption are known from the prior art. Such processes may be used to remove down to trace amounts unwanted constituents of crude synthesis gases produced by gasification or reforming of carbon-containing inputs, for example carbon dioxide ($CO_2$) and hydrogen sulfide ($H_2S$) but also carbonyl sulfide (COS), mercaptans and hydrogen cyanide (HCN), from the wanted synthesis gas constituents such as hydrogen ($H_2$) and carbon monoxide (CO).

These processes also referred to as gas scrubbings utilize the properties of liquids to absorb gaseous substances and to keep them in solution in physically or chemically bound form. The efficiency with which a gas is physically absorbed by a liquid is expressed by the absorption coefficient also known as the solubility coefficient. The better the absorption or dissolution of the gas in the liquid the greater the absorption coefficient. The absorption coefficient generally increases with decreasing temperature and, in accordance with Henry's law, with increasing pressure. The liquids employed in gas scrubbings are generally also referred to as scrubbing media or absorption media.

Subsequently to the gas scrubbing, components scrubbed out of the crude synthesis gas in the gas scrubbing are removed from the laden absorption medium to obtain a regenerated or at least partially regenerated absorption medium. Known processes for regeneration of the absorption medium are depressurization (flashing) with or without stripping gas and hot regeneration where the intrinsic vapour of the absorption medium is used as a stripping gas.

A known and often employed gas scrubbing process is the Rectisol process which is described in principle in Ullmann's Encyclopedia of Industrial Chemistry, 6th Ed. Vol. 15, p. 399 et seq. In the Rectisol process the abovementioned undesired constituents of the crude synthesis gas are absorbed by cold methanol, i.e. methanol cooled significantly below ambient temperature, as an absorbent or absorption medium, wherein intensive mass transfer between the crude synthesis gas and the absorption medium takes place in an absorption apparatus also known as an absorber or scrubbing column. As mentioned above the solubility of the undesired gas constituents increases with decreasing temperature of the methanol and increasing pressure while remaining practically constant for hydrogen and carbon monoxide. Methanol additionally has the advantage of retaining a low viscosity even at temperatures down to −75° C., thus making it usable on a large industrial scale even at very low temperatures.

The absorption apparatuses used in gas scrubbings in each case have dedicated regions or stages for removal of acidic gas constituents and further impurities. As a result of selectivity of the respective absorption medium for particular gas constituents these are absorbed more or less easily. In the example of the Rectisol process operating with methanol as the absorption medium, trace constituents such as hydrogen cyanide (HCN) are absorbed most easily, followed by the sulfur compounds hydrogen sulfide ($H_2S$), carbonyl sulfide (COS) and mercaptans and finally followed by carbon dioxide ($CO_2$) which, compared to the abovementioned gases, has the lowest absorption coefficient with regard to methanol. This selectivity has the result that the dedicated regions or stages of the absorption apparatus generally produce an absorption medium laden primarily with carbon dioxide, an absorption medium laden with hydrogen sulfide and carbon dioxide ("desulfurization"), and an absorption medium laden with trace constituents.

Hydrogen sulfide ($H_2S$) removed in the desulfurization in the Rectisol process is typically expelled again by hot regeneration of the methanol laden with $H_2S$. The thus obtained $H_2S$-containing gas, also known as acid gas, may subsequently be supplied to a plant for production of elemental sulfur by the Claus process. The acid gas supplied to the Claus plant must meet certain requirements in terms of the $H_2S$ content which should not normally fall below 25 mol %.

In the context of the Rectisol process a so-called reabsorber is used to achieve the highest possible $H_2S$ content in the acid gas. The reabsorber is initially supplied with methanol laden with $H_2S$ and $CO_2$ from the desulfurization stage of the absorption apparatus. $CO_2$ is then virtually completely expelled by decompression and stripping with nitrogen and removed as offgas. Hydrogen sulfide coexpelled during stripping is reabsorbed by methanol supplied to the reabsorber, wherein on account of the greater absorption coefficient in methanol of $H_2S$ compared to $CO_2$ essentially $H_2S$ and negligible amounts of $CO_2$ are reabsorbed. The methanol laden with $H_2S$ exiting the reabsorber is subsequently supplied to a hot regeneration to afford an acid gas comprising $H_2S$ as the primary constituent. The acid gas exiting the hot regeneration has an $H_2S$ content that is sufficiently high and a $CO_2$ content that is sufficiently low to generally meet the requirements for the Claus process.

The acid gas exiting the hot regeneration cannot be supplied directly to the Claus process. On the contrary the acid gas must in a step upstream of the Claus process be freed of methanol vapours coexpelled in the hot regeneration by condensation of these vapours in an acid gas separator. This increases the $H_2S$ content in the acid gas to the required amount. The acid gas separator has an absorption region and at least two discharge openings. The first discharge opening allows discharging of the acid gas in the direction of a Claus plant. The second discharge opening allows recycling of a portion of the acid gas treated in the absorption region to the reabsorber. Accordingly a portion of the hydrogen sulfide supplied to the acid gas separator is recycled to the reabsorber thus resulting in an elevated content of hydrogen sulfide in the acid gas.

The absorption region of the acid gas separator allows removal of trace components such as HCN and/or $NH_3$ which are intended to leave the gas scrubbing plant in the direction of the Claus plant with the acid gas. The abovementioned trace components should not pass into other parts of the gas scrubbing plant to prevent contamination of synthesis gas or other products. HCN further has corrosive properties which can result in certain plant parts requiring the use of a high-value steel as a material of construction. $NH_3$ is formed for example from HCN in the context of a water-gas shift reaction (reaction of carbon monoxide with water to afford hydrogen and carbon dioxide) arranged upstream of the gas scrubbing and may therefore be present in trace amounts in the crude synthesis gas. $NH_3$ is typically scrubbed out in an ammonia scrubber with water as the absorption medium prior to the absorption with methanol. If this does not fully remove $NH_3$, residues thereof can accumulate in the top region of the hot regenerator. If $NH_3$ passes into the reabsorber via the acid gas separator it reacts there with $CO_2$ to form ammonium carbamate and/or ammonium carbonate which can result in obstructions and blockages of component parts. $NH_3$ and $H_2S$ react to form ammonium sulfide which accumulates in the absorption medium and can contaminate the synthesis gas.

HCN and/or $NH_3$ are accordingly components which should at no point in the process pass into the reabsorber or other plant components.

Therefore HCN and/or $NH_3$ are as standard absorbed in the absorption region of the acid gas separator using cryogenic methanol. The acid gas largely freed of HCN and/or $NH_3$ can subsequently be passed to the reabsorber without issue.

In the acid gas separator cryogenic methanol, typically from the reabsorber, and less cold, at least partially condensed methanol from the hot regenerator are combined. Hydrogen cyanide and/or ammonia discharged from the less cold methanol of the hot regenerator may be dissolved by the cryogenic methanol which is more absorbent as a result of the temperature difference. This procedure ensures that less HCN and/or $NH_3$ leaves the acid gas separator in the direction of the Claus plant. This is accompanied by an accumulation of HCN and/or $NH_3$ in the top region of the hot regenerator. Cryogenic methanol used in the acid gas separator further requires that parts of the acid gas separator coming into contact therewith must be fabricated from a high-value material of construction, for example a stainless steel. Attendant higher materials costs for the acid gas separator are to be avoided.

SUMMARY OF THE INVENTION

It is accordingly an object of certain embodiments of the present invention to specify a process which at least partially overcomes the abovementioned disadvantages of the prior art.

It is a further object of certain embodiments of the invention to specify a process which improves the absorption of HCN and/or $NH_3$ in the acid gas separator so that the smallest possible proportion of these substances passes from the acid gas separator into the reabsorber.

It is a further object of certain embodiments of the invention to specify a process which reduces the use of high-quality materials of construction such as stainless steels in component parts used in the context of the process.

It is a further object of certain embodiments of the invention to specify an apparatus or a use which at least partially achieves the objects recited above.

The objects of certain embodiments of the invention are at least partially achieved by a process for purifying crude synthesis gas with methanol as a physical absorption medium, wherein an acid gas comprising at least hydrogen sulfide ($H_2S$) is produced and the process comprises the following process steps, wherein the process steps need not necessarily be carried out in the specified sequence:

treating crude synthesis gas comprising at least carbon monoxide (CO), hydrogen ($H_2$), hydrogen sulfide ($H_2S$) and hydrogen cyanide (HCN) and/or ammonia ($NH_3$) with methanol in an absorption apparatus to obtain a methanol laden with at least $H_2S$ and HCN and/or $NH_3$;

hot-regenerating the methanol laden with $H_2S$ and HCN and/or $NH_3$ in a hot regenerator to obtain a gas mixture comprising at least methanol, $H_2S$, HCN and/or $NH_3$ which is withdrawn from the hot regenerator;

cooling the gas mixture withdrawn from the hot regenerator and transferring the cooled gas mixture into an acid gas separator, wherein the acid gas separator comprises an absorption region and a condensation region, wherein the absorption region and the condensation region are separated from one another by a gas-permeable tray;

condensing methanol from the gas mixture in the condensation region of the acid gas separator, withdrawing the condensed methanol from the acid gas separator and transferring it to the hot regenerator;

withdrawing a first acid gas substream comprising $H_2S$ and HCN and/or $NH_3$ from the acid gas separator;

passing a second acid gas substream comprising $H_2S$ and HCN and/or $NH_3$ through the absorption region of the acid gas separator, wherein HCN and/or $NH_3$ are absorbed by cryogenic methanol supplied to the absorption region of the acid gas separator, cryogenic methanol laden with HCN and/or $NH_3$ collects in the region of the gas-permeable tray and a second acid gas substream at least partially freed of HCN and/or $NH_3$ is obtained;

withdrawing the second acid gas substream at least partially freed of HCN and/or $NH_3$ from the acid gas separator;

withdrawing the cryogenic methanol laden with HCN and/or $NH_3$ from the region of the gas-permeable tray of the acid gas separator and transferring the cryogenic methanol laden with HCN and/or $NH_3$ to the hot regenerator.

In the context of the subject matter of the invention the term "physical absorption medium" is to be understood as meaning an absorption medium where the solubility of the particular gas in the absorption medium is brought about by physical interactions.

In the context of the subject matter of the invention the term "crude synthesis gas" is to be understood as meaning a synthesis gas which contains not only desired constituents such as hydrogen ($H_2$) and carbon monoxide (CO) but also undesired constituents such as hydrogen sulfide ($H_2S$) and carbon dioxide ($CO_2$) from which it is to be freed in a gas scrubbing process.

In the context of the subject matter of the invention an "acid gas" is to be understood as meaning a gas or gas mixture which comprises at least one component which is acidic in water or another suitable protic solvent such as for example hydrogen sulfide ($H_2S$) or hydrogen cyanide (HCN). In the context of the subject matter of the invention the acid gas may also comprise one or more basic or neutral components in addition to one or more acidic components. One example of a basic component in the acid gas is ammonia ($NH_3$).

In the context of the subject matter of the invention an "acid gas separator" is to be generally understood as meaning an apparatus for separating a liquid from a mixture, wherein the mixture may be for example a biphasic mixture of at least one gas and one liquid, for example an aerosol, wherein the apparatus is suitable for separation of an acid gas from such a mixture.

In the context of the subject matter of the invention a "condensation region" of the acid gas separator is to be understood as meaning a region suitable for the conversion of a substance in a mixture from the gaseous into the liquid state of matter.

In the context of the subject matter of the invention an "absorption region" of the acid gas separator is to be understood as meaning a region suitable for absorption of at least one gaseous substance into a suitable liquid absorption medium.

In the context of the subject matter of the invention "cryogenic methanol" is to be understood as meaning methanol having a temperature of not more than 0° C., or not more than −15° C., or not more than −30° C., or not more than −40° C., or not more than −50° C., or not more than −60° C.

In the context of the subject matter of the invention a "gas-permeable tray" is to be understood as meaning a tray which is permeable to gaseous substances. The gas-permeable tray is simultaneously partially or completely impermeable to liquids. In one example the gas-permeable tray may be constructed such that a liquid layer can collect on the gas-permeable tray up to a certain amount so that depending on its mode of construction the gas-permeable tray is impermeable to a liquid up to a certain extent. In one example the gas-permeable tray is unidirectionally impermeable to a liquid, i.e. in one direction the gas-permeable tray is impermeable to a liquid but in another, for example opposite, direction the gas-permeable tray is permeable to a liquid. In one example the gas-permeable tray is a tray which on account of its macroscopic geometric configuration may be traversed by a gas but on which a layer of a liquid can simultaneously collect up to a certain amount, thus making the tray at least partially impermeable to the liquid. In another example the gas-permeable tray is a tray which on a microscopic level is configured such that it is passable by a gas but not by a liquid. An example of such a tray is a membrane permeable to gases and impermeable to liquids. The recited examples are not to be understood as being limiting and further embodiments of gas-permeable trays are therefore conceivable.

In the context of the subject matter of the invention a "hot regenerator" is to be understood as meaning an apparatus which is generally suitable for hot regeneration of laden absorption media, in particular for hot regeneration of laden absorption media with intrinsic vapour of the absorption medium.

In processes known from the prior art a pre-cooled mixture of at least partially condensed methanol (biphasic mixture of vapourous and liquid methanol) and acid gas enters the acid gas separator. Acid gas comprising at least $H_2S$ and comprising HCN and/or $NH_3$ as impurities is liberated from the mixture and is discharged from the acid gas separator as a first substream.

A second substream of the acid gas is simultaneously passed through the absorption region of the acid gas separator and after absorption of impurities such as HCN and/or $NH_3$ exits the acid gas separator to be supplied for example to an $H_2S$ concentration in a further step. Impurities such as HCN and/or $NH_3$ present in the second substream are removed by cryogenic methanol in the absorption region of the acid gas separator. The low temperature of the cryogenic methanol disadvantageously also causes impurities outgassing from the first substream to be absorbed which may subsequently accumulate for example in the top region of the hot regenerator.

The process mode according to the invention in which the condensation region and the absorption region of the acid gas separator are separated from one another by a gas-permeable tray has the result that the abovementioned disadvantage is eliminated. The gas-permeable tray prevents cryogenic methanol from coming into contact with impurities outgassing from the first substream such as HCN and/or $NH_3$. On the contrary, cryogenic methanol collected in the region of the gas-permeable tray which comprises exclusively impurities such as HCN and/or $NH_3$ from the second substream is withdrawn from the gas-permeable tray and subsequently recycled into the hot regenerator. Contact between the cryogenic methanol and the gases of the first substream is therefore not possible, as a result of which impurities such as HCN and/or $NH_3$ from the first substream are advantageously not absorbed by cryogenic methanol. There is consequently no accumulation of impurities additionally absorbed from the first substream such as HCN and/or $NH_3$ in the hot regenerator or other plant parts.

One preferred embodiment of the process according to the invention is characterized in that the condensed methanol and the cryogenic methanol laden with HCN and/or $NH_3$ are supplied to a mixing vessel as separate streams and after mixing in the mixing vessel are recycled to the hot regenerator.

In the context of the subject matter of the invention the term "mixing vessel" is to be understood as meaning that an at least partial commixing of the fluids supplied to the mixing vessel takes place in the mixing vessel. In one example the commixing is brought about by diffusion and/or convection. In a further example the commixing is instead or in addition brought about by a static mixer and/or an active mixer. The types of this commixing are not limited to the recited examples.

A converging of the temperatures of the cryogenic methanol withdrawn from the gas-permeable tray from the absorption region and of the condensed methanol from the condensation region of the acid gas separator takes place in the mixing vessel.

It is preferable when the gas mixture withdrawn from the hot regenerator too is supplied to the mixing vessel and in the mixing vessel combined with the condensed methanol and the cryogenic methanol laden with HCN and/or $NH_3$, wherein methanol from the gas mixture at least partially condenses to afford a biphasic mixture and the biphasic mixture containing at least partially condensed methanol is subsequently supplied to the acid gas separator.

The biphasic mixture comprises vapourous and gaseous methanol and acid gases. To further improve the equalization of temperature differences a mixing with the gas mixture withdrawn from the hot regenerator and the streams withdrawn from the acid gas separator takes place in the mixing vessel. This advantageously prevents unintentional discharging of gases from condensed methanol. Gases discharged from condensed methanol may for example cause problems in the recycling of the methanol condensed in the acid gas separator to the hot regenerator. The mixing vessel arranged between the hot regenerator and the acid gas separator and the mixing operation taking place continually in the mixing vessel effectively prevents such outgassing and simultaneously effects a temperature equalization between the individual streams without the need for additional heat exchangers.

A preferred embodiment of the process according to the invention is characterized in that the second acid gas substream at least partially freed of HCN and/or $NH_3$ is supplied to a reabsorber for reabsorption of $H_2S$ present in the second acid gas substream at least partially freed of HCN and/or $NH_3$ to obtain methanol laden with $H_2S$ in the reabsorber.

The reabsorber has the primary function of initially expelling carbon dioxide from a methanol stream withdrawn from the absorption apparatus and laden with hydrogen sulfide ($H_2S$) and carbon dioxide ($CO_2$) by stripping with an inert gas and thus re-absorbing unintentionally coexpelled hydrogen sulfide in cryogenic methanol. Supplying the second acid gas substream to the reabsorber brings about a further concentration of $H_2S$ and the acid gas produced in the hot regenerator accordingly has a higher $H_2S$ content.

In a further example it is preferred that the methanol laden with $H_2S$ obtained in the reabsorber is supplied to the hot regenerator.

A preferred embodiment of the process according to the invention is characterized in that the cryogenic methanol is supplied to the absorption region of the acid gas separator from the reabsorber.

The methanol circulating in the reabsorber has a suitably low temperature and loading with $H_2S$ to be able to effectively absorb impurities such as HCN and/or $NH_3$ as well as $H_2S$ from the second substream.

A preferred embodiment of the process according to the invention is characterized in that the cryogenic methanol has a temperature of not more than $-40°$ C., preferably not more than $-50°$ C., particularly preferably not more than $-60°$ C.

The lower the temperature of the cryogenic methanol the more effective the absorption of impurities such as HCN and/or $NH_3$ from the second substream of the acid gas. A temperature range between $-40°$ C. and $-75°$ C. has proven particularly advantageous since this achieves a high absorption efficiency while also ensuring that the hydrodynamic properties of the methanol are advantageous for large industrial scale use on account of the relatively low dynamic viscosity up to $-75°$ C. It is particularly preferable when the cryogenic methanol has a temperature range between $-60°$ C. and $-65°$ C. The colder the methanol used for the absorption, the better its properties as an absorption medium.

One preferred embodiment of the process according to the invention is characterized in that the first acid gas substream is supplied to a Claus plant for producing sulfur.

Consequently the process according to the invention produces an acid gas having a sulfur proportion sufficient for use in a Claus plant. The sulfur proportion is not determined exclusively by the hydrogen sulfide present in the acid gas but also by mercaptans (thiols) and carbonyl sulfide (COS) and possibly further sulfur compounds absorbed in methanol.

One preferred embodiment of the process according to the invention is characterized in that the mixing vessel has at least one filling port for supplying the cryogenic methanol laden with HCN and/or $NH_3$ and/or the condensed methanol, wherein one end of the filling port is spaced apart from a housing wall of the mixing vessel such that the cryogenic methanol laden with HCN and/or $NH_3$ and/or the condensed methanol do not come into direct contact with the housing wall of the mixing vessel during the filling operation.

The mixing vessel has at least one filling port for supplying the cryogenic methanol laden with HCN and/or $NH_3$ and/or the condensed methanol to the mixing vessel, wherein the separate streams are supplied to the mixing vessel either via a common filling port or each stream is supplied via at least one dedicated filling port. A mixing of the cryogenic methanol laden with HCN and/or $NH_3$ and of the condensed methanol with markedly warmer gas mixture comprising at least methanol, $H_2S$, and also HCN and/or $NH_3$ supplied from the hot regenerator takes place in the mixing vessel. Since laden methanol cooled to very low temperatures in particular can damage the material of the mixing vessel by corrosion it is advantageous to arrange the filling port such that there is no contact between the cold methanol and the mixing vessel during the filling operation. Immediately after the filling of the cryogenic methanol laden with HCN and/or $NH_3$ and of the condensed methanol this is mixed with gas mixture comprising at least methanol, H2S, and also HCN and/or $NH_3$ from the hot regenerator and thus heated, thus reducing the likelihood of corrosive damage.

The housing of the mixing vessel preferably comprises a non-alloyed or low-alloy steel as a material of construction, wherein a non-alloyed steel is more preferable.

This is made possible by the appropriate arrangement of the filling ports where the filling port(s) are spaced apart from a housing wall of the mixing vessel such that the cryogenic methanol laden with HCN and/or $NH_3$ and/or the condensed methanol do not come into direct contact with the housing wall of the mixing vessel during the filling operation. It is thus not necessary to fabricate the housing of the mixing vessel from a high-value steel.

In the context of the subject matter of the invention a "non-alloyed steel" is to be understood as meaning a steel which contains no intentionally added alloying elements. Carbon is not considered an alloying element. Steel concomitants such as silicon and manganese in natural not intentionally alloyed amounts may be present in non-alloyed steel.

In the context of the subject matter of the invention a "low-alloy steel" is to be understood as meaning a steel which intentionally contains alloyed constituents but only in low contents. In particular a low-alloy steel does not contain any alloying element having a content of more than five percent by weight.

A preferred embodiment of the process according to the invention is characterized in that the filling port comprises an acid- and rust-resistant steel as a material of construction.

Since the filling port of the mixing vessel is in contact with cryogenic methanol laden with HCN and/or $NH_3$ and/or condensed methanol said port advantageously comprises an acid- and rust-resistant steel as a material of construction. In a further preferred example exclusively the filling port of the mixing vessel as the only component part of the mixing vessel comprises an acid- and rust-resistant steel as a material of construction. Other parts of the mixing vessel, preferably parts that are in contact with methanol, do not contain any acid- and rust-resistant steel as a material of construction. These parts preferably comprise a non-alloyed or low-alloy steel as a material of construction, preferably a non-alloyed steel.

In the context of the subject matter of the invention an "acid- and rust-resistant steel" is to be understood as meaning a steel which as a result of appropriate alloying additions forms a protective oxide layer which protects the steel from acid corrosion and/or oxygen corrosion. In particular an acid-resistant or rust-proof steel has an alloying proportion of at least 10.5% by weight of chromium, preferably at least 13% by weight of chromium. It is preferable when an acidand rust-resistant steel further comprises at least one element selected from the group comprising nickel, molybdenum, titanium and nitrogen as a further alloying constituent or further alloying constituents.

The objects of the invention are further at least partially achieved by an acid gas separator for separating an acid gas comprising at least hydrogen sulfide ($H_2S$) from a gas mixture, comprising an absorption region and a condensation region, wherein the absorption region and the condensation region are separated from one another by a gas-permeable tray; means for supplying a gas mixture comprising at least methanol, $H_2S$ and HCN and/or $NH_3$ to the condensation region of the acid gas separator for condensation of methanol from the gas mixture in the condensation region of the acid gas separator; means for withdrawing a first acid gas substream comprising $H_2S$ and also HCN and/or $NH_3$ from the acid gas separator; means for absorption of HCN and/or $NH_3$ from a second acid gas substream comprising $H_2S$ and also HCN and/or $NH_3$ in the absorption region of the acid gas separator; means for withdrawing a second acid gas substream at least partially freed of HCN and/or $NH_3$ from the acid gas separator;
means for supplying cryogenic methanol to the absorption region of the acid gas separator for absorption of HCN and/or $NH_3$ in cryogenic methanol in the absorption region of the acid gas separator;
means for withdrawing a cryogenic methanol laden with HCN and/or $NH_3$ from the absorption region of the acid gas separator;
means for withdrawing condensed methanol from the condensation region of the acid gas separator.

A preferred embodiment of the acid gas separator according to the invention is characterized in that the condensation region and the absorption region are integrated into a single common housing of the acid gas separator.

This allows for a space-saving arrangement inside a gas scrubbing plant without additional conduits between the condensation region and the absorption region being required. The gas-permeable tray ensures sufficient spatial separation of the condensation region and the absorption region and an integration of both regions into one housing is therefore possible without impurities outgassing from the first acid gas substream such as HCN and/or $NH_3$ being able to pass into the absorption region and be absorbed there by cryogenic methanol.

A preferred embodiment of the acid gas separator according to the invention is characterized in that at least one housing part of the absorption region of the acid gas separator comprises a rust-resistant or acid-resistant steel as a material of construction and/or in that at least one housing part of the condensation region of the acid gas separator comprises a non-alloyed or low-alloy steel as a material of construction, preferably a non-alloyed steel.

Since it is primarily the absorption region of the acid gas separator that is subjected to very low temperatures through cryogenic methanol it is sufficient and advantageous to provide exclusively the absorption region of the acid gas separator with a high-value material of construction such as a rust-resistant or acid-resistant steel. For the condensation region which is not subjected to such low temperatures it is sufficient to use a non-alloyed or low-alloy steel as a material of construction.

A preferred embodiment of the acid gas separator according to the invention is characterized in that the gas-permeable tray is in the form of a chimney tray.

A gas-permeable tray in the form of a chimney tray is traversible from bottom to top by the gas mixture of the second acid gas substream. Above the chimney tray constituents from the second acid gas substream such as HCN and/or $NH_3$ are absorbed by cryogenic methanol and can collect on the chimney tray in the absorption region. The cryogenic methanol laden with impurities from the second acid gas substream such as HCN and/or $NH_3$ is withdrawable from the chimney tray via a conduit without subsequently being able to come into contact with the gases of the first acid gas substream.

A preferred embodiment of the acid gas separator according to the invention is characterized in that the absorption region of the acid gas separator comprises a fixed bed. In a preferred example the fixed bed comprises a dumped bed of packing bodies for increasing the surface area of the absorption region. This increases the efficiency of the absorption of the impurities from the second acid gas substream.

The objects of the invention are further at least partially solved by the use of the acid gas separator according to the invention in a process according to the invention.

BRIEF DESCRIPTION OF THE DRAWINGS

Further features, advantages and possible applications of the invention are also apparent from the following description of a working and numerical example and from the drawings. All the features described and/or depicted, on their own or in any combination, form the subject matter of the invention, irrespective of their combination in the claims or their dependency references.

In the figures

DETAILED DESCRIPTION OF THE INVENTION

Figure 1:
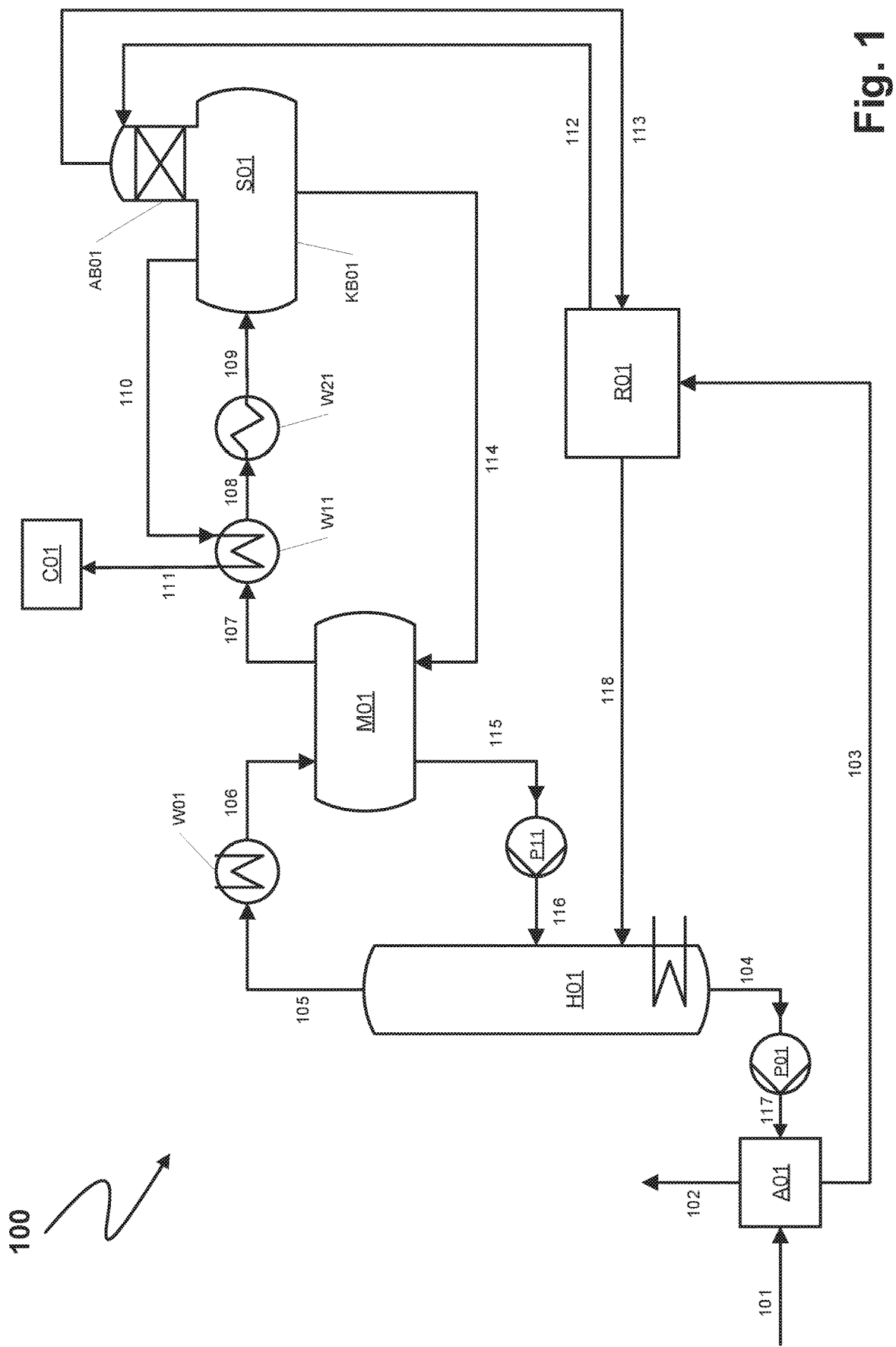
FIG. 1 shows a schematic flow diagram of a prior art process and a plant for purifying crude synthesis gas to produce an acid gas.

FIG. 1 shows a process/a plant 100 for purifying crude synthesis gas with methanol as a physical absorption medium, wherein an acid gas comprising hydrogen sulfide ($H_2S$) is produced and supplied to a Claus plant for producing elemental sulfur.

Via a conduit 101 an absorption apparatus A01 is supplied at a pressure of 40 bar with a crude synthesis gas which contains as desired constituents carbon monoxide (CO) and hydrogen ($H_2$) and as undesired constituents to be removed hydrogen sulfide ($H_2S$), carbon dioxide ($CO_2$) and hydrogen cyanide (HCN). In the absorption apparatus A01 $H_2S$, $CO_2$ and HCN are removed by treatment with cold methanol as the absorption medium. Purified synthesis gas exits absorption apparatus A01 via a conduit 102. Methanol laden with $H_2S$ and $CO_2$ is withdrawn from absorption apparatus A01 via a conduit 103 and supplied to a reabsorber R01. Furthermore, methanol laden with HCN and methanol laden with $CO_2$ are withdrawn from the absorption apparatus as further streams. Methanol laden with HCN, also known as prewash methanol, is supplied directly to the hot regenerator H01 (not shown). After passing through one or more depressurization stages for removing $CO_2$ (flashing) methanol laden with $CO_2$ is likewise supplied to the hot regenerator H01 (not shown). Methanol regenerated by flashing with intrinsic vapour in hot regenerator H01 is withdrawn via a conduit 104 and via a pump P01 and a conduit 117 is supplied to the absorption apparatus A01 for renewed absorption of undesired constituents from synthesis gas.

In reabsorber R01 $CO_2$ is expelled as inert gas from methanol laden with $CO_2$ and $H_2S$ by flashing with nitrogen. Coexpelled hydrogen sulfide is likewise reabsorbed by methanol in reabsorber R01. Thus obtained methanol laden with $H_2S$ is supplied via a conduit 118 to hot regenerator H01 for removal of $H_2S$. In the hot regenerator H01 heating (boiling) of methanol laden with $H_2S$ and HCN affords a gas mixture which comprises methanol vapours, $H_2S$ and HCN and is withdrawn from hot regenerator H01 via a conduit 105. After cooling of the gas mixture withdrawn from hot regenerator H01 in a heat exchanger W01 to about 40° C. the mixture, now biphasic due to partial condensation of methanol, of $H_2S$, HCN, methanol vapour and liquid methanol is supplied to a mixing vessel M01 via a conduit 106. This mixture is withdrawn from the mixing vessel M01 via a conduit 107 and after further cooling in an indirect heat exchanger W11 and an indirect heat exchanger W21 supplied via the conduits 107, 108 and 109 to an acid gas separator S01. Acid gas separator S01 has a condensation region KB01 (lower part) and an absorption region AB01 (upper region), wherein absorption region AB01 comprises a fixed bed of packing bodies to increase the internal surface area. Upon entry into acid gas separator S01 the mixture of methanol, $H_2S$ and HCN has a temperature of about −36° C. In acid gas separator S01 the gas phase composed of $H_2S$ and HCN is separated from the methanol liquid phase in the condensation region KB01. A first acid gas substream thus obtained composed of $H_2S$ and HCN is withdrawn from acid gas separator S01 via a conduit 110, used for cooling the mixture supplied from the conduit 107 in heat exchanger W11 and subsequently supplied via a conduit 111 to a Claus plant C01 for recovery of elemental sulfur. The mixture in conduit 111 has a temperature of about 25° C.

A second acid gas substream is passed through absorption region AB01 of the acid gas separator S01 to absorb HCN from the second acid gas substream with cryogenic methanol. Cryogenic methanol is supplied to the absorption region AB01 of the acid gas separator S01 from reabsorber R01 via a conduit 112 and has a temperature of about −63° C. Acid gas of the second acid gas substream freed of HCN and now comprising primarily $H_2S$ is supplied via a conduit 113 to reabsorber R01, thus allowing $H_2S$ to be retained in the circuit and sent back to hot regenerator H01 with the methanol stream in conduit 104.

Condensed methanol from acid gas separator S01 is supplied via a conduit 114 to mixing vessel M01 and therein combined with partially condensed methanol and gas mixture from conduit 106 and at least partially mixed, thus effecting a continuous temperature equalization between the components present in mixing vessel M01. The temperature equalization brought about in mixing vessel M01 prevents unintentional outgassing through too fast or uncontrolled heating which can cause problems during the recycling of the methanol to hot regenerator H01 via the conduits 115 and 116 and pump P11. Regenerated methanol produced in hot regenerator H01 is withdrawn as mentioned above via conduit 104 and via pump P01 and conduit 117 is supplied to the absorption apparatus A01 for renewed absorption of undesired constituents from synthesis gas.

The process according to FIG. 1 has the problem that in acid gas separator S01 methanol cooled to −63° C. supplied from reabsorber R01 via conduit 112 can also absorb HCN from the first acid gas substream. However this HCN gas is destined for discharging in the direction of a Claus plant. As a result, accumulations of HCN in the hot regenerator H01 and further problems already mentioned hereinabove can disadvantageously occur.

Figure 2:
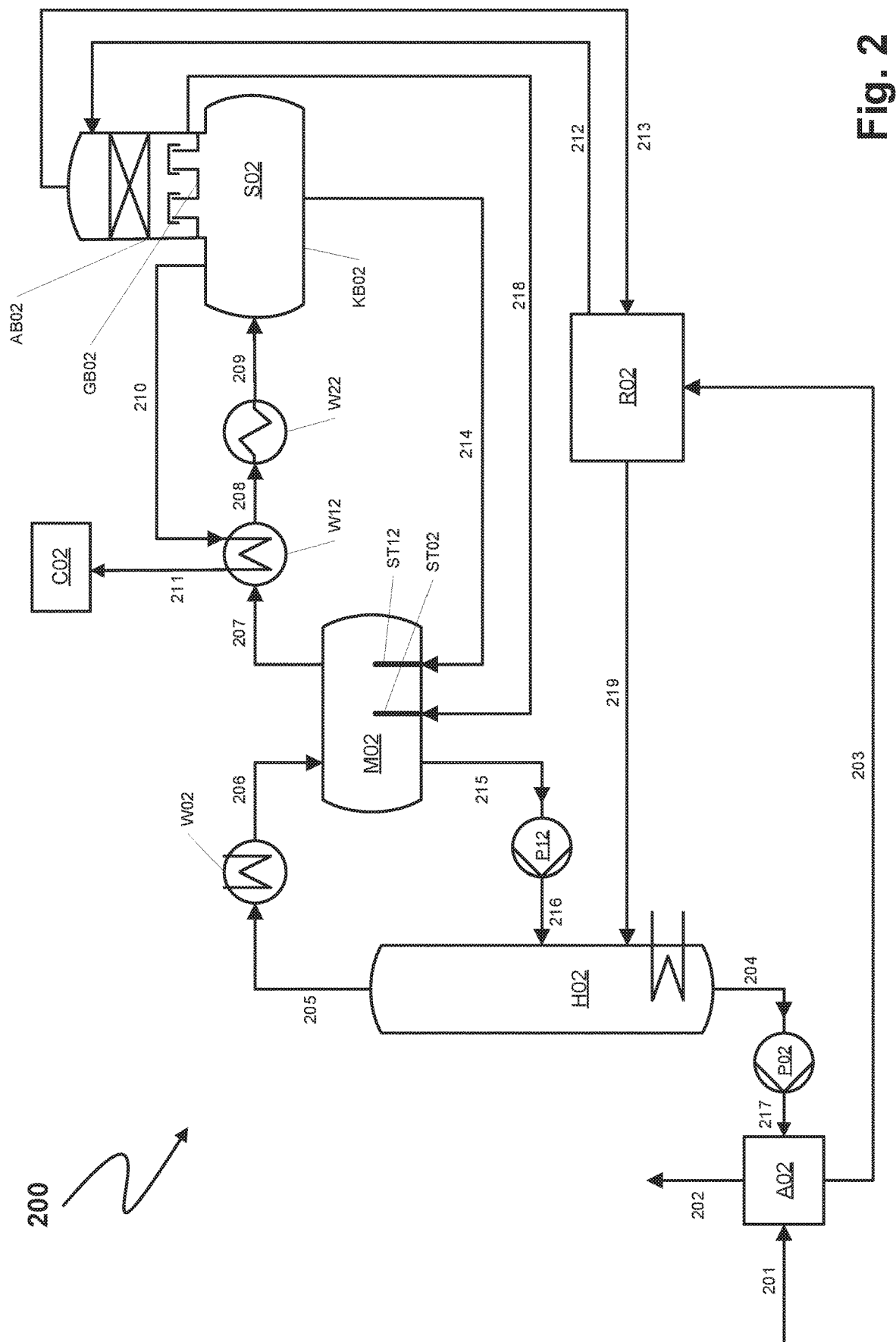
FIG. 2 shows a schematic flow diagram of an inventive process and a plant for purifying crude synthesis gas to produce an acid gas using an inventive acid gas separator.

FIG. 2 shows a process 200 according to the invention for purifying crude synthesis gas with methanol as a physical absorption medium, wherein an acid gas comprising hydrogen sulfide ($H_2S$) is produced and supplied to a Claus plant for producing elemental sulfur. FIG. 2 further shows an acid gas separator according to the invention and the use thereof in the process according to the invention.

Via a conduit 201 an absorption apparatus A02 is supplied at a pressure of 40 bar with a crude synthesis gas which contains as desired constituents carbon monoxide (CO) and hydrogen ($H_2$) and as undesired constituents to be removed hydrogen sulfide ($H_2S$), carbon dioxide ($CO_2$) and hydrogen cyanide (HCN). In absorption apparatus A02 $H_2S$, $CO_2$ and HCN are removed by treatment with cold methanol as the absorption medium. Purified synthesis gas exits absorption apparatus A02 via a conduit 202. Methanol laden with $H_2S$ and $CO_2$ is withdrawn from absorption apparatus A02 via a conduit 203 and supplied to a reabsorber R02. Furthermore, methanol laden with HCN and methanol laden with $CO_2$ are withdrawn from the absorption apparatus as further streams. Methanol laden with HCN, also known as prewash methanol, is supplied directly to the hot regenerator H02 (not shown). After passing through one or more depressurization stages for removing $CO_2$ (flashing) methanol laden with $CO_2$ is likewise supplied to the hot regenerator H02. Methanol regenerated by flashing with intrinsic vapour in hot regenerator H02 is withdrawn via a conduit 204 and via a pump P02 and a conduit 217 is supplied to the absorption apparatus A02 for renewed absorption of undesired constituents from synthesis gas.

In reabsorber R02 $CO_2$ is expelled as inert gas from methanol laden with $CO_2$ and $H_2S$ by flashing with nitrogen. Coexpelled hydrogen sulfide is likewise reabsorbed by methanol in reabsorber R02. Thus obtained methanol laden with $H_2S$ is supplied via a conduit 219 to hot regenerator H02 for removal of $H_2S$. In hot regenerator H02 heating (boiling) of methanol laden with $H_2S$ and HCN affords a gas mixture which comprises methanol vapours, $H_2S$ and HCN and is withdrawn from hot regenerator H02 via a conduit 205. After cooling of the gas mixture withdrawn from hot regenerator H02 in a heat exchanger W02 to about 40° C. the mixture, now biphasic due to partial condensation of methanol, of $H_2S$, HCN, methanol vapour and liquid methanol is supplied to a mixing vessel M02 via a conduit 206. This mixture is withdrawn from mixing vessel M02 via a conduit 207 and after further cooling in an indirect heat exchanger W12 and an indirect heat exchanger W22 supplied via the conduits 207, 208 and 209 to an acid gas separator S02 according to the invention.

Acid gas separator S02 has a condensation region KB02 (lower part) and an absorption region AB02 (upper region), wherein absorption region AB02 comprises a fixed bed of packing bodies to increase the internal surface area. According to the invention absorption region AB02 and condensation region KB02 are separated from one another by a gas-permeable tray GB02. Gas-permeable tray GB02 is in the form of a chimney tray in the example shown. The housing part of the absorption region AB02 of acid gas separator S02 is fabricated from a rust-resistant steel while the housing part of the condensation region KB02 of the acid gas separator S02 is fabricated from a low-alloy steel.

Upon entry into acid gas separator S02 the mixture of methanol, $H_2S$ and HCN has a temperature of about −36° C. In acid gas separator S02 the gas phase composed of $H_2S$ and HCN is separated from the methanol liquid phase in the condensation region KB02. A first acid gas substream thus obtained composed of $H_2S$ and HCN is withdrawn from acid gas separator S02 via a conduit 210, used for cooling the mixture supplied from the conduit 207 in heat exchanger W12 and subsequently supplied via a conduit 211 to a Claus plant CO2 for recovery of elemental sulfur. The mixture in conduit 211 has a temperature of about 25° C.

A second acid gas substream is passed from the condensation region KB02 through gas-permeable tray GB02 from bottom to top via absorption region AB02 of the acid gas separator S02 to absorb HCN from the second acid gas substream with cryogenic methanol. Cryogenic methanol laden with HCN collects as a liquid level (not shown) on gas-permeable tray GB02. Methanol laden with HCN which has collected on the gas-permeable tray GB02 in the form of a chimney tray is supplied via a conduit 218 and a filling port ST02 to mixing vessel M02. As a result of its end being spaced apart from the housing wall of the mixing vessel M02 the filling port ST02 is arranged such that cryogenic methanol laden with HCN does not come into contact with the housing wall of mixing vessel M02 during the filling operation. The housing wall of mixing vessel M02 is fabricated from a low-alloy steel while filling port ST02 is fabricated from a higher-alloy, acid- and rust-resistant steel. As a result of arrangement of the gas-permeable tray GB02 in acid gas separator S02 and the recycling of methanol laden with HCN via conduit 218 and filling port ST02 into mixing vessel M02 and then hot regenerator H02, cryogenic methanol withdrawn from the gas-permeable tray GB02 does not come into contact with HCN gas present in the condensation region KB02. This means that a reabsorption of HCN from the second acid gas stream into methanol in the condensation region KB02 of acid gas separator S02 is not possible. There is consequently no accumulation of HCN in hot regenerator H02 or other component parts of the gas scrubbing plant.

Cryogenic methanol used for absorption of HCN in absorption region AB02 is supplied via a conduit 212 from reabsorber R02 to the absorption region AB02 of the acid gas separator S02. Said methanol has a temperature of about −63° C. Acid gas of the second acid gas substream freed of HCN and now comprising primarily $H_2S$ is supplied via a conduit 213 to reabsorber R02, thus allowing $H_2S$ to be retained in the circuit and sent back to hot regenerator H02 with the methanol stream in conduit 204.

Condensed methanol from acid gas separator S02 is supplied via a conduit 214 to mixing vessel M02 via a filling port ST12 fabricated from rust-resistant steel and there mixed with partially condensed methanol and gas mixture from conduit 206, thus resulting in a continuous temperature equalization between the components present in mixing vessel M02. Similarly to the end of filling port ST02 the end of filling port ST12 is spaced apart from the wall of the mixing vessel M02. The temperature equalization brought about in mixing vessel M02 prevents unintentional outgassing through too fast or uncontrolled heating which can cause problems during the recycling of the methanol to hot regenerator H02 via the conduits 215 and 216 and pump P12. Regenerated methanol produced in hot regenerator H02 is withdrawn as mentioned above via conduit 204 and via pump P01 and conduit 217 is supplied to absorption apparatus A01 for renewed absorption of undesired constituents from synthesis gas.

Advantages of the process according to the invention and of the acid gas separator according to the invention are further elucidated by the following numerical example. The $NH_3$, HCN, $H_2S$ and COS content in the gas mixture leaving the acid gas separator in the direction of the Claus plant via the conduits 111 or 211 and the content of the abovementioned gases in the methanol condensed in the acid gas separator which is recycled to the mixing vessel (M01 or M02) via the conduits 114, 214 and 218 were examined. The values shown in the following table were calculated in mol % in the course of a simulation using the software "Aspen Plus" and normalized to 100% for the comparative example so that values according to the invention show the mole fraction variation based on the normalized 100% value.

| | Acid gas to Claus plant | | Condensed methanol | |
|---|---|---|---|---|
| | Example (invention) | Comparative example | Example (invention) | Comparative example |
| | | Mole fraction variation | | |
| $H_2S$ | 100% | 100% | 98% | 100% |
| COS | 100% | 100% | 99% | 100% |
| $NH_3$ | 114% | 100% | 57% | 100% |
| HCN | 138% | 100% | 74% | 100% |

The example shows that compared to the known process according to the comparative example the inventive process and the inventive acid gas separator have the result that 14% more $NH_3$ and 38% more HCN pass into the Claus plant. Simultaneously, the proportion of these substances in the condensed methanol is advantageously reduced by 43% ($NH_3$) and 26% (HCN).

Embodiments of the invention are described with reference to different types of subject matter. In particular, certain embodiments are described with reference to process claims while other embodiments are described with reference to apparatus claims. However, it will be apparent to a person skilled in the art from the description hereinabove and hereinbelow that unless otherwise stated in addition to any combination of features belonging to one claim type, any combination of features relating to different types of subject matter or claim types may also be contemplated. All features may be combined to achieve synergistic effects which go beyond simple summation of the technical features.

While the invention has been represented and described in detail in the drawings and the preceding description, such representation and description shall be considered elucidatory or exemplary and non-limiting. The invention is not limited to the disclosed embodiments. Other variations of the disclosed embodiments may be understood and carried out by those skilled in the art of the field of the claimed invention through study of the drawings, the disclosure and the dependent claims.

In the claims the word "having" or "comprising" does not exclude further elements or steps and the indefinite article "a" does not exclude a plurality. Reference numerals in the claims should not be interpreted as limiting the scope of the claims.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

LIST OF REFERENCE NUMERALS

100 Process and plant
101 to 118 Conduit
A01 Absorption apparatus
AB01 Absorption region
C01 Claus plant
H01 Hot regenerator
KB01 Condensation region
M01 Mixing vessel
P01, P11 Pump
R01 Reabsorber
S01 Acid gas separator
W01, W11, W21 Heat exchanger
200 Process and plant
201 to 219 Conduit
A02 Absorption apparatus
AB02 Absorption region
C02 Claus plant
GB02 Gas-permeable tray
H02 Hot regenerator
KB02 Condensation region
M02 Mixing vessel
P02, P12 Pump
R02 Reabsorber
S02 Acid gas separator
ST02, ST12 Filling port
W02, W12, W22 Heat exchanger

The invention claimed is:

1. A process for purifying crude synthesis gas with methanol as a physical absorption medium, wherein an acid gas comprising hydrogen sulfide ($H_2S$) is produced and the process comprises the following process steps:
a. treating crude synthesis gas comprising carbon monoxide (CO), hydrogen ($H_2$), hydrogen sulfide ($H_2S$) and hydrogen cyanide (HCN) and/or ammonia ($NH_3$) with methanol in an absorption apparatus to obtain a methanol laden with at least $H_2S$ and HCN and/or $NH_3$;
b. hot-regenerating the methanol laden with $H_2S$ and HCN and/or $NH_3$ in a hot regenerator to obtain a gas mixture comprising at least methanol, $H_2S$, HCN and/or $NH_3$ which is withdrawn from the hot regenerator;
c. cooling the gas mixture withdrawn from the hot regenerator and transferring the cooled gas mixture into an acid gas separator, wherein the acid gas separator comprises an absorption region and a condensation region, wherein the absorption region and the condensation region are separated from one another by a gas-permeable tray;
d. condensing methanol from the gas mixture in the condensation region of the acid gas separator, withdrawing the condensed methanol from the acid gas separator and transferring it to the hot regenerator;
e. withdrawing a first acid gas substream comprising $H_2S$ and HCN and/or $NH_3$ from the acid gas separator;
f. passing a second acid gas substream comprising $H_2S$ and HCN and/or $NH_3$ through the absorption region of the acid gas separator, wherein HCN and/$NH_3$ are absorbed by cryogenic methanol supplied to the absorption region of the acid gas separator, cryogenic methanol laden with HCN and/or $NH_3$ collects in the region of the gas-permeable tray and a second acid gas substream at least partially freed of HCN and/or $NH_3$ is obtained;
g. withdrawing the second acid gas substream at least partially freed of HCN and/or $NH_3$ from the acid gas separator; and
h. withdrawing the cryogenic methanol laden with HCN and/or $NH_3$ from the region of the gas-permeable tray of the acid gas separator and transferring the cryogenic methanol laden with HCN and/or $NH_3$ to the hot regenerator.

2. The process according to claim 1, wherein the acid gas separator comprises:
i. an absorption region and a condensation region, wherein the absorption region and the condensation region are separated from one another by a gas-permeable tray;
ii. means for supplying a gas mixture comprising at least methanol, $H_2S$ and HCN and/or $NH_3$ to the condensation region of the acid gas separator for condensation of methanol from the gas mixture in the condensation region of the acid gas separator;
iii. means for withdrawing a first acid gas substream comprising $H_2S$ and HCN and/or $NH_3$ from the acid gas separator;
iv. means for absorption of HCN and/or $NH_3$ from a second acid gas substream comprising $H_2S$ and also HCN and/or $NH_3$ in the absorption region of the acid gas separator;
v. means for withdrawing a second acid gas substream at least partially freed of HCN and/or $NH_3$ from the acid gas separator;
vi. means for supplying cryogenic methanol to the absorption region of the acid gas separator for absorption of HCN and/or $NH_3$ in cryogenic methanol in the absorption region of the acid gas separator;
vii. means for withdrawing a cryogenic methanol laden with HCN and/or $NH_3$ from the absorption region of the acid gas separator; and
viii. means for withdrawing condensed methanol from the condensation region of the acid gas separator.

3. The process according to claim 1, wherein the cryogenic methanol has a temperature of not more than −40° C., preferably not more than −50° C., particularly preferably not more than −60° C.

4. The process according to claim 1, wherein the first acid gas substream is supplied to a Claus plant for producing sulfur.

5. The process according to claim 1, wherein the condensed methanol and the cryogenic methanol laden with HCN and/or $NH_3$ are supplied to a mixing vessel as separate streams and after mixing in the mixing vessel are recycled to the hot regenerator.

6. The process according to claim 5, wherein the gas mixture withdrawn from the hot regenerator is supplied to the mixing vessel, combined in the mixing vessel with the condensed methanol and the cryogenic methanol laden with HCN and/or $NH_3$, wherein methanol from the gas mixture at least partially condenses to afford a biphasic mixture and the biphasic mixture containing at least partially condensed methanol is subsequently supplied to the acid gas separator.

7. The process according to claim 5, wherein the mixing vessel has at least one filling port for supplying the cryogenic methanol laden with HCN and/or $NH_3$ and/or the condensed methanol, wherein one end of the filling port is spaced apart from a housing wall of the mixing vessel such that the cryogenic methanol laden with HCN and/or $NH_3$ and/or the condensed methanol do not come into direct contact with the housing wall of the mixing vessel during the filling operation.

8. The process according to claim 7, wherein the housing of the mixing vessel comprises a non-alloyed or low-alloy steel as a material of construction, preferably a non-alloyed steel.

9. The process according to claim 7, wherein the filling port comprises an acid- and rust-resistant steel as a material of construction.

10. The process according to claim 1, wherein the second acid gas substream at least partially freed of HCN and/or $NH_3$ is supplied to a reabsorber for reabsorption of $H_2S$ present in the second acid gas substream at least partially freed of HCN and/or $NH_3$ to obtain methanol laden with $H_2S$ in the reabsorber.

11. The process according to claim 10, wherein the methanol laden with $H_2S$ is supplied to the hot regenerator.

12. The process according to claim 10, wherein the cryogenic methanol is supplied to the absorption region of the acid gas separator from the reabsorber.

* * * * *